(12) United States Patent
Kaufhold et al.

(10) Patent No.: US 11,428,276 B2
(45) Date of Patent: Aug. 30, 2022

(54) FREEWHEEL HAVING A PRE-TENSIONING DEVICE FOR CLAMPING ELEMENTS

(71) Applicant: BorgWarner Inc., Auburn Hills, MI (US)

(72) Inventors: Tobias Kaufhold, Sandhausen (DE); Hans Jürgen Hauck, Schwäbisch Hall (DE); Friedrich Philipp Brezger, Karlsruhe (DE); Oliver Groneberg, St. Leon-Rot (DE); Florian Schneider, Hockenheim (DE); Peter Dötterl, Waldershof (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/303,422

(22) Filed: May 28, 2021

(65) Prior Publication Data

US 2021/0372490 A1    Dec. 2, 2021

(30) Foreign Application Priority Data

May 29, 2020    (DE) .......................... 102020003255.9
Nov. 19, 2020    (DE) .......................... 102020007070.1

(51) Int. Cl.
*F16D 41/066*    (2006.01)

(52) U.S. Cl.
CPC ..... *F16D 41/066* (2013.01); *F16D 2041/0665* (2013.01)

(58) Field of Classification Search
CPC ........... F16D 41/066; F16D 2041/0605; F16D 2041/0665
See application file for complete search history.

(56) References Cited

U.S. PATENT DOCUMENTS 2,069,558 A * 2/1937 Rauen ................... F16D 41/064
                                                        192/45.02
2017/0122386 A1* 5/2017 Veit ........................ F16D 41/066

* cited by examiner

*Primary Examiner* — Ernesto A Suarez
*Assistant Examiner* — Lori Wu
(74) *Attorney, Agent, or Firm* — Howard & Howard Attorneys PLLC

(57) ABSTRACT

The present invention relates to a freewheel (2) having a first race (16), a second race (18), a clamping gap (20) formed between the first and second race (16, 18), at least one clamping element (30) in the clamping gap (20) and a pre-tensioning device (32) for pre-tensioning the clamping element (30) in a clamping position inside the clamping gap (20), wherein the pre-tensioning device (32) has a spring element (34) supported indirectly or directly on the first race (16). The pre-tensioning device (32) further has a spring support frame (36) that can be moved in relation to the first race (16), in which spring support frame the spring element (34) is arranged.

20 Claims, 4 Drawing Sheets

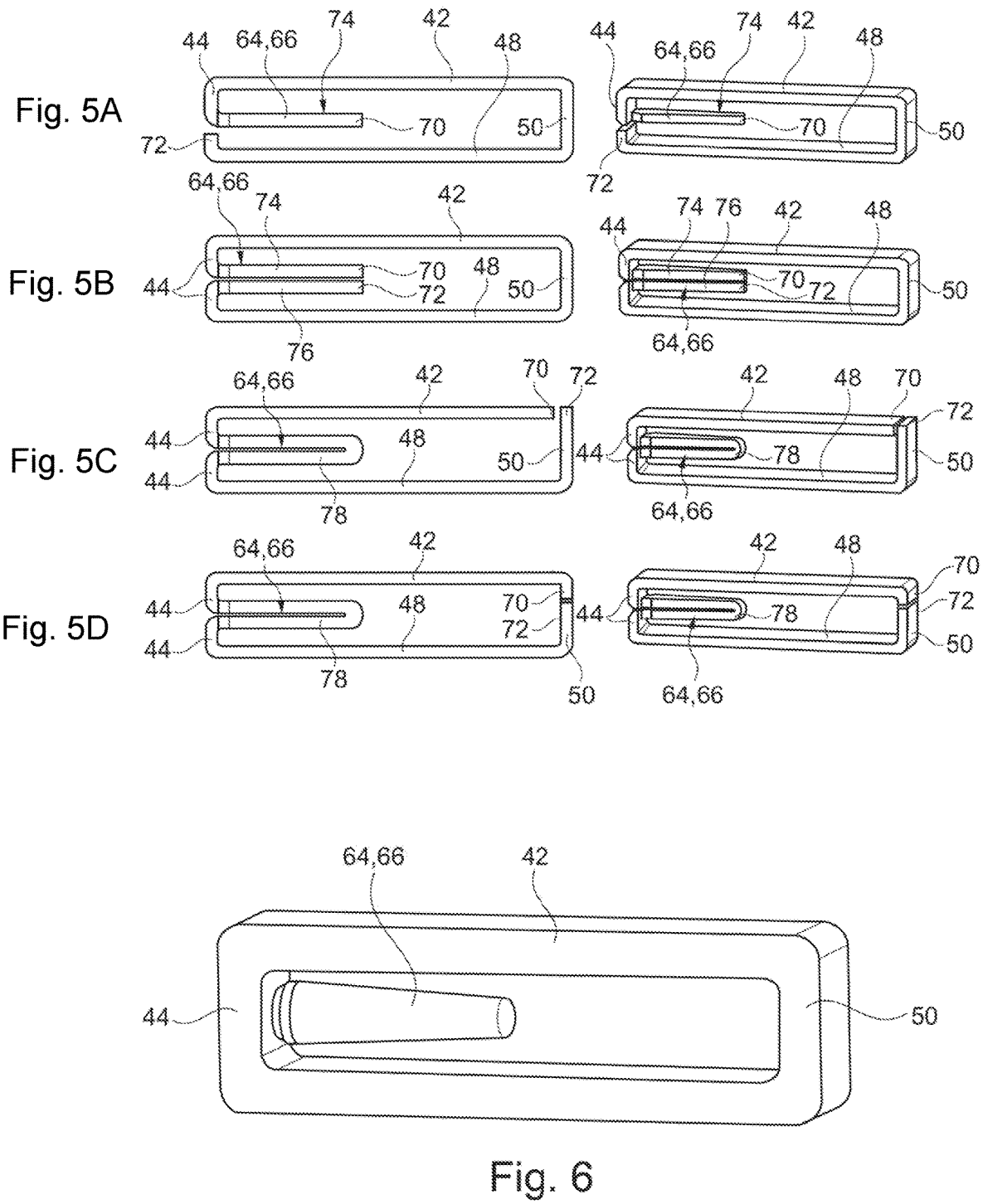

FREEWHEEL HAVING A PRE-TENSIONING DEVICE FOR CLAMPING ELEMENTS

CROSS-REFERENCE TO RELATED APPLICATIONS

This application claims priority pursuant to 35 U.S.C. 119(a) of German Patent Application No. 102020003255.9 filed May 29, 2020, and German Patent Application No. 102020007070.1, filed Nov. 19, 2020, which applications are incorporated herein by reference in the entirety.

SUMMARY

The present invention relates to a freewheel having a first race, a second race, a clamping gap formed between the first and second race, at least one clamping element in the clamping gap and a pre-tensioning device for pre-tensioning the clamping element in a clamping position inside the clamping gap, wherein the pre-tensioning device has a spring element supported indirectly or directly on the first race.

Freewheels are known from practice which have a first race and a second race, for example an outer race and an inner race. A clamping gap running around in the peripheral direction is formed between the first and second race, wherein several clamping elements spaced apart from one another in the peripheral direction are arranged inside the clamping gap. The clamping elements are, in general, clamping rollers, which can be supported or are supported on the sides of the two races facing each other. Moreover, known freewheels have pre-tensioning devices allocated to the clamping elements, said pre-tensioning devices serving to pre-tension the clamping element in a clamping position inside the clamping gap. Known pre-tensioning devices are here formed by a spring element, for example a coil spring, a chimney spring or meander spring, wherein the spring element is supported indirectly, i.e. for example via a side part delimiting the clamping gap in the axial direction and connected to the first race in a rotationally entrained manner, or directly on the first race on one side, and directly on the corresponding clamping element on the other side.

Known freewheels have proved successful, yet are in need of improvement as and when it comes to increased attrition between the spring element of the pre-tensioning device and the adjacent components, such as the first race or the side part, for example, when the spring element is tensioned or relaxed. Moreover, the insertion of the spring element into the freewheel proves to be difficult, such that increased effort is required when mounting the freewheel.

Thus, an object of the present invention is to develop a freewheel of the generic type in such a way that, on the one hand, it can be mounted or assembled particularly easily and, on the other hand, enables as low-friction a tensioning and relaxing of the spring element of the pre-tensioning device as possible while avoiding hysteresis effects.

This object is solved by the features specified herein. Advantageous embodiments of the invention are the subject matter as described herein.

The freewheel according to the invention has a first race and a second race. Thus, the first race can preferably be an outer race, while the second race can be an inner race. A clamping gap running around in the peripheral direction is formed between the first and second race. The clamping gap preferably has a height changing in the peripheral direction, which can be obtained, for example, by a course, deviating from a circle, of the side of the first race facing towards the clamping gap, while the side of the second race facing towards the clamping gap has a circular course. At least one clamping element is arranged in the clamping gap, wherein a plurality of clamping elements spaced apart from one another in the peripheral direction is preferably arranged inside the clamping gap. These are also arranged in the clamping gap preferably with preferably even spacing apart from one another in the peripheral direction. The at least one clamping element is preferably a clamping roller, which is particularly preferably formed to be coin-shaped, i.e. particularly short in the axial direction. The freewheel is preferably a classical freewheel, in which the first race can be freely rotated in the peripheral direction in relation to the second race, while it is coupled in a rotationally entrained manner to the second race via the clamping elements in a clamping position during a relative rotation in the opposite peripheral direction in comparison to the second race. The freewheel further has a pre-tensioning device for pre-tensioning the clamping element in a clamping position inside the clamping gap. Here, the pre-tensioning device is constructed substantially in two parts. Thus, the pre-tensioning device has a spring element supported indirectly or directly on the first race. The spring element is preferably a coil spring or coil compression spring; however, alternatively, a so-called chimney spring or meander spring can also be used. Moreover, the pre-tensioning device further has a spring support frame that can be moved in relation to the first race, in which spring support frame the spring element is arranged. By the spring element being arranged in the spring support frame, its handling during mounting and the insertion of the pre-tensioning device into the freewheel is clearly simplified. Moreover, the spring support frame that can be moved in relation to the first race causes it to result in a shorter relative movement between the tensioning or relaxing spring element and the similarly moving support frame when tensioning and relaxing the spring element during the operation of the freewheel, whereby the frictional forces counteracting the tensioning and relaxing of the spring element are reduced. As a result, this leads to an increased effective spring force, which can be applied to the clamping element, wherein hysteresis effects can also be avoided. Attrition on the spring element or the spring element jamming can also be counteracted by doing so. The pre-tensioning device is formed on its own preferably as a coherent module, the spring element and spring support frame of which are arranged captively mounted one on top of the other.

Although we always discuss a spring support frame above and below, the spring support frame of the pre-tensioning device does not necessarily have to surround the spring element completely or in a closed manner Thus, in an advantageous embodiment of the freewheel according to the invention, the spring support frame substantially or exclusively has an outer limb for supporting the spring element outwardly in the radial direction and a contact limb, via which the spring element can be supported or is supported on the clamping element. In this way, on the one hand, increased attrition between the spring element and the first race placed outwardly in the radial direction and, on the other hand, increased attrition between the spring element and the clamping element can be avoided, wherein, in the first case, this is caused by interposing the outer limb and, in the second case, by interposing the contact limb.

In a particularly advantageous embodiment of the freewheel according to the invention, in addition to the outer limb and the contact limb, the spring support frame has an inner limb opposite the outer limb for supporting the spring element inwardly in the radial direction. In this way, the advantages achieved by a support of the spring element outwardly in the radial direction on the outer limb are also achieved inwardly in the radial direction by the support of the spring element on the opposite inner limb, namely a reduced attrition force acting on the tensioning and relaxing spring element on the inner limb, wherein an indirect support of the spring element is also possible via the inner limb inwardly in the radial direction inside the freewheel, which will be elaborated on again later as part of a further embodiment. Furthermore, the limbs lying opposite one another in the radial direction, namely the outer limb on one side and the inner limb on the other side, have the advantage that the spring element is received particularly securely in the spring support frame, which simplifies the handling of the pre-tensioning device and its mounting inside the freewheel.

According to a further advantageous embodiment of the freewheel according to the invention, at least one side part connected to the first race is provided for delimiting the clamping gap in the axial direction, in order to hold the clamping elements and/or the pre-tensioning device, for example, inside the clamping gap in at least this axial direction. Here, it is preferred if two side parts lying opposite each other in the axial direction are provided which are preferably each connected to the first race in a rotationally entrained manner. The side parts are preferably side parts formed substantially in the shape of ring discs, particularly preferably sheet metal parts.

In a preferred embodiment of the freewheel according to the invention, a first protruding attachment is provided on the side part or at least one of the two side parts of the freewheel to indirectly support the spring element on the first race. Expressed more precisely, the indirect support of the spring element on the first race is carried out here via the first protruding attachment of the side part and the side part connected to the first race in a rotationally entrained manner Among other things, this has the advantage that a relatively simple first race can be used, which does not have to have a laborious construction for supporting the spring element, since the support of the spring element can be carried out easily via the first protruding attachment of the side part. Such a first protruding attachment can also be generated relatively simply, i.e. with reduced manufacturing effort, on the side part. Thus, with this embodiment, it is preferred if the first protruding attachment is formed integrally with the side part, particularly preferably as a bent support tongue, in order to minimise the production effort of the freewheel and to ensure an arrangement of the first protruding attachment close to the spring. Thus, the first protruding attachment can be generated, for example, by bending a portion out of the side part and into the clamping gap.

In a particularly preferred embodiment of the freewheel according to the invention, the first protruding attachment extends into the spring support frame of the pre-tensioning device. In this way, a compact construction with particularly minimal space requirements is obtained. In this embodiment, it is preferred if the spring support frame further has a support limb lying opposite the contact limb, said support limb being supported or able to be supported particularly preferably on the first protruding attachment and/or the first race or on an abutment on the first race. Consequently, by supporting the support limb on the first protruding attachment, an end position and/or by supporting the support limb on the first race, a further end position of the pre-tensioning device would be set together with the spring element and spring support frame, wherein the first protruding attachment could extend between the contact limb and the support limb, and the spring element would in turn be arranged between the protruding attachment and the contact limb. In doing so, a loss prevention arrangement of the pre-tensioning device in at least one of the movement directions of the pre-tensioning device is obtained.

In a further particularly advantageous embodiment of the freewheel according to invention, a second protruding attachment is provided on the side part for supporting the inner limb of the spring support frame inwardly in the radial direction. Here, the second protruding attachment can be provided on the same side part on which the first protruding attachment is also provided. With a view to mounting the freewheel, this is also preferred especially because, in doing so, a secure holding of the pre-tensioning device on the one side part is already ensured before the optionally present further side part is mounted. Nonetheless, with two side parts, the second protruding attachment can alternatively be provided on the side part lying opposite the side part with the first protruding attachment. Notwithstanding the respective arrangement of the second protruding attachment, the second protruding attachment is preferably formed integrally with the corresponding side part, particularly preferably as a bent support tongue. If the relevant side part is formed as a sheet metal part, then a portion of this sheet metal part can, for example, be bent out and bent into the clamping gap, in order to form said support tongue and to engage behind the inner limb of the spring support frame inwardly in the radial direction.

In a further advantageous embodiment of the freewheel according to the invention, at least one axial protrusion is provided on the spring support frame, said protrusion extending into a guide in the side part. In this way, the pre-tensioning device is not only guided securely on the freewheel in its movement directions, but rather a support of the spring support frame is also ensured via the axial protrusion and the side part on the first race, without the outer limb, mentioned above, of the spring support frame, for example, having to be supported directly on the first race, although this would nevertheless additionally be possible. The axial protrusion is preferably formed to be elongated in the movement direction of the pre-tensioning device and particularly preferably extends into a guide in the side part which is formed correspondingly elongated and can be formed, for example, as a slot-shaped recess. In order to be able to guide the spring support frame particularly securely in the movement direction of the pre-tensioning device in this embodiment and to support it in the radial direction on the side part, it is preferred if at least two axial protrusions are provided on the spring support frame, which extend either into the same guide or into guides formed separately from one another in the side part. Furthermore, it is preferred if the axial protrusion can be supported or is supported on the side part, consequently on the end of the guide, inside the guide upon reaching at least one end position, in order to predetermine the predefined end position or the predefined end positions.

In a further particularly preferred embodiment of the freewheel according to the invention, the spring support frame has at least one spring holding means for supporting the spring element arranged in the spring support frame in at least one axial direction or in both axial directions. In doing so, a particularly secure and, optionally loss-preventative arrangement of the spring element inside the spring support frame is already present when installing the pre-tensioning device in the freewheel, such that a simple handling and mounting of the device is ensured. In order to reduce the number of parts, consequently to minimise the production effort, and moreover to obtain a particularly compact construction, the at least one spring holding means is preferably formed integrally with the spring support frame.

In a further preferred embodiment of the freewheel according to the invention, the spring holding means mentioned above for supporting the spring element arranged in the spring support frame is formed as a spring holding attachment protruding into the spring support frame, said spring holding attachment extending into a coil spring interior chamber of the spring element formed as a coil spring, preferably a coil compression spring. The protruding spring holding attachment is here preferably arranged on the contact limb, such that this extends, for example, in the direction of the optionally present support limb mentioned above. It is also preferred if the protruding spring holding attachment is formed integrally with the contact limb of the spring support frame.

While the spring holding means in the form of the spring holding attachment mentioned above according to the embodiment described above extend into the coil spring interior chamber of the spring element formed as a coil spring, in a further particularly preferred embodiment of the freewheel according to the invention, the spring holding means engage behind the spring element at least partially outwardly in the axial direction. In doing so, a particularly simple arrangement of the spring element inside the spring support frame is possible, without the spring holding means having to engage in an interior chamber of the spring element, such that the introduction of the spring element into the spring support frame is also simplified. In this embodiment, it is moreover preferred if the spring holding means is arranged on the outer and/or inner limb of the spring support frame. In doing so, it has also proved to be advantageous when the spring holding means is formed integrally with the outer and/or inner limb, such that the outer and/or inner limb here have a dual function, namely supporting the spring element both in one of the radial direction and in one, preferably both, axial directions inside the spring support frame.

In a further preferred embodiment of the freewheel according to the invention, the outer and/or inner limb is formed to be curved or bent by forming the spring holding means described above in a manner at least partially engaging around a spring outer periphery of the spring element formed as a coil spring. In doing so, a construction of the spring support frame of the pre-tensioning device that can be manufactured particularly easily and is compact is obtained.

In a further advantageous embodiment of the freewheel according to the invention, the spring support frame is formed integrally.

According to a further advantageous embodiment of the freewheel according to the invention, the spring support frame is produced from plastic or metal. In the case of a spring support frame produced from metal, it is preferred if it is bent out of an elongated metal part, preferably a sheet metal band, wherein the spring holding means mentioned above are also generated, for example, by a corresponding shaping of the elongated metal part. Although it is not necessarily required, it is moreover preferred if the bent elongated metal part is welded on the end side, in order to create a particularly stable spring support frame. Thus, the ends of the bent elongated metal part or at least its end regions can be welded to one another, for example, in order to obtain said advantages.

BRIEF DESCRIPTION OF THE DRAWINGS

The invention is explained in more detail below by means of exemplary embodiments with reference to the drawings enclosed. Here are shown:

FIGS. 5A to 5D show various embodiments of a spring support frame produced from metal for use in the freewheel according to FIGS. 3 and 4 in a side view and perspective depiction respectively, FIG. 6 a further embodiment variant of a spring support frame made of plastic for use in the freewheel according to FIGS. 3 and 4, FIG. 7 a perspective depiction of an embodiment of the spring pre-tensioning device for use in the freewheel according to FIGS. 3 and 4, FIG. 8 a side view of the pre-tensioning device from FIG. 7, and FIG. 9 a cut-out depiction along with the sectional line A-A in FIG. 8.

DETAILED DESCRIPTION

Figure 1:
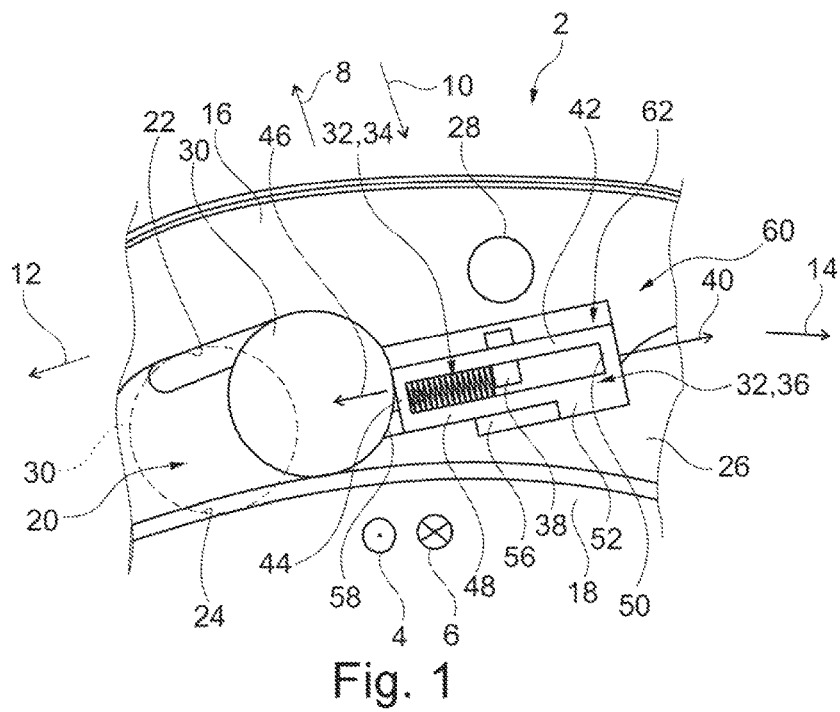
FIG. 1 a partial side view of a first embodiment of the freewheel.

FIGS. 1 and 2 show a first embodiment of the freewheel 2. In the figures, the opposite axial directions 4, 6, the opposite radial directions 8, 10 and the opposite peripheral directions 12, 14 of the freewheel 2 are indicated by means of corresponding arrows, wherein the components of the freewheel 2 can be rotated around an axis of rotation extending in the axial directions 4, 6 and not depicted.

The freewheel 2 has a first race 16 and a second race 18. Here, the first race 16 is formed as an outer race which outwardly surrounds the second race 18 in the radial direction 8, which is consequently formed as the inner race. In the radial direction 8, 10 between the first race 16 and the second race 18, a clamping gap 20 running around in the peripheral direction 12, 14 is formed, wherein an inner side 22 of the first race 16 is facing towards the clamping gap 20 in the radial direction 10, while an outer side 24 of the second race 18 is facing towards the clamping gap 20 in the radial direction 8. As can be seen in FIG. 1, the inside 22 of the first race 16 has a course in the peripheral direction 12, 14 deviating from an annular course in the side view, whereas the outer side 24 of the second race 18 has an annular course in the peripheral direction 12, 14.

In the axial direction 6, the clamping gap 20 is delimited at least partially by the side part 26 which is formed substantially in a ring-disc manner and is connected to the first race 16 in a rotationally entrained manner, as is indicated by way of example by means of the fixing hole 28 extending both through the first race 16 and through the side part 26 in the axial direction 4, 6, through which a screw or rivet connection can be guided, for example, for fixing the side part 26 on the first race 16. Furthermore, the freewheel 2 also has a side part lying opposite the side part 26 and also formed substantially in a ring-disc manner, which delimits the clamping gap 20 in the axial direction 4 and is also in a rotationally entrained connection with the first race 16, wherein this further side part has been dispensed with in the depiction for reasons of clarity. This further side part can also be fixed non-rotationally on the first race 16 via the fixing hole 28 already mentioned and a fixing means, such as a screw or a rivet, for example, to be arranged therein.

At least one clamping element 30 is arranged inside the clamping gap 20, said clamping element being formed as a substantially coin-shaped clamping roller in the embodiment depicted. Although only one clamping element 30 is depicted in FIG. 1, it is thus preferred if several clamping elements 30 spaced apart from one another as evenly as possible in the peripheral direction 12, 14 are arranged inside the clamping gap 20. The clamping element 30 can be moved inside the clamping gap 20 substantially between the release position shown in FIG. 1 and the clamping position indicated by dashes in FIG. 1.

If the first race 16 is rotated in relation to the second race 18 in the peripheral direction 14, then the clamping element 30 reaches its clamping position indicated in dashes, in which the periphery of the clamping element 30 formed as a clamping roller is supported outwardly in the radial direction 8 on the inner side 22 of the first race 16 and inwardly in the radial direction 10 on the outer side 24 of the second race 18, and the two races 16, 18 are clamped to one another in such a way that a rotationally entrained connection between the first race 16 and the second race 18 exists. If the first race 16, in contrast, rotates in relation to the second race 18 in the peripheral direction 12, then the clamping element 30 reaches the release position shown in FIG. 1 in which no rotationally entrained coupling via the clamping elements 30 takes place, such that the first race 16 can be rotated freely in relation to the second race 18 in the peripheral direction 12.

The clamping element 30 is pre-tensioned by a pre-tensioning device 32 into the clamping position indicated by dashes inside the clamping gap 20. The pre-tensioning device 32 has a spring element 34 supported indirectly or directly on the first race 16 and a spring support frame 36 that can be moved in relation to the first race 16, in which the spring element 34 is arranged. In the embodiment according to FIG. 1, the spring element 34 is formed as a coil spring or a coil compression spring and is supported on the first race 16 indirectly via a first protruding attachment 38, which is arranged on the side part 26 and protrudes into the clamping gap 20 in the axial direction 4. Expressed more precisely, the spring element 34 is supported on the first race 16 in a first movement direction 40 of the pre-tensioning device 32 via the first protruding attachment 38 and the side part 26 non-rotationally connected to the first race 16.

The spring support frame 36 has an outer limb 42 in the radial direction 8 for laterally supporting the spring element 34 outwardly in the radial direction 8. A contact limb 44 of the spring support frame 36 is attached to the end of the outer limb 42 facing towards the corresponding clamping element 30, via which contact limb the spring element 34 can be supported or is supported on the corresponding clamping element 30, wherein the end of the spring element 34 facing away from the first protruding attachment 38 is supported or can be supported on the side of the contact limb 44 facing away from the clamping element 30. Consequently, the contact limb 44 can be supported on the clamping element 30 in the second movement direction 46 of the pre-tensioning device 32 in opposition to the first movement direction 40, while the spring element 34 can be supported or is supported on this contact limb 44 in this second movement direction 46 on the side of the contact limb 44 facing away. Furthermore, the spring support frame 36 has an inner limb 48 lying opposite the outer limb 42 and running substantially in parallel to it for laterally supporting the spring element 34 inwardly in the radial direction 10, which extends in the first movement direction 40 from the end of the contact limb 44 pointing inwardly in the radial direction 10. The ends of the outer and inner limbs 42, 48 pointing in the first movement direction 40 are connected to each other via a supporting limb 50 lying opposite the contact limb 44 in the first movement direction 40, such that the limbs 42, 48 form a closed spring support frame 36 in connection with the contact limb 44 and the support limb 50 in the embodiment depicted. The first protruding attachment 38, which is formed integrally with the side part 26, optionally as a support tongue bent out of the side part 26, extends into the spring support frame 36 in such a way that this is arranged transversely to the opposite movement directions 40, 46 between the outer limb 42 and the inner limb 48 and in the movement directions 40, 46 between the contact limb 44 and the support limb 50, wherein the spring element 34 extends exclusively between the first protruding attachment 38 and the contact limb 44.

At least one axial protrusion is provided on the spring support frame 36. In the concrete embodiment according to FIGS. 1 and 2, a first axial protrusion 52 and a second axial protrusion 54 spaced apart from it are formed on the spring support frame 36, which are formed to protrude beyond the spring support frame 36 in the axial direction 6, as can be seen, in particular, in FIG. 2, in which the spring support frame 36 is shown from different viewing directions on its own. The two axial protrusions 52, 54 are formed to be elongated in the movement directions 40, 46 and are substantially provided on the inner limb 48 of the spring support frame 36. While the first axial protrusion 52 extends into a first guide 56 in the side part 26, the second axial protrusion 54 extends into a second guide 58 in the side part 26, wherein the two guides 56, 58 are each formed as elongated recesses in the side part 26 and extend substantially in the movement directions 40, 46 in opposition to one another. Consequently, the spring support frame 36 and thus also the entire pre-tensioning device 32 is guided securely on the side part 26 in opposite movement directions 40, 46. Here, the first guide 56 can be formed to be long in such a way that the spring support frame 36 can be supported on the end of the first guide 56 via the first axial protrusion 52 in the first movement direction 40, in order to predetermine a first end position of the spring support frame 36, which is shown in FIG. 1. Alternatively or additionally, the spring support frame 36 can be supported on an abutment 60 of the first race 16 via the support limb 50 in the first movement direction 40, in order to predetermine this first end position of the spring support frame 36. The same applies to an end position of the spring support frame 36 and consequently the entire pre-tensioning device 32 in the second movement direction 46 opposite the first movement direction 40, by the spring support frame 36, for example, being shifted in the second movement direction 46 until the first axial protrusion 52 is supported on the end of the first guide 56 in the second movement direction 46. Consequently, the spring support frame 36 can, in principle, be able to be supported or be supported on the side part 26 in both movement directions 40, 46 in the respective end position via the end of the first guide 56, in particular when the clamping elements 30 are not yet introduced into the freewheel 2 as part of the mounting, such that the spring support frame 36 can be prevented from falling out in the opposite movement directions 40, 46. As an additional or alternative measure for fixing the end position of the spring support frame 36 in the second movement direction 46, it should be mentioned that the support limb 50 and the first protruding attachment 38 can also be arranged on the side part 26 in such a way that the support limb 50 for fixing the end position of the spring support frame 36 in the second movement direction 46 can be able to be supported or can be supported on the first protruding attachment 38 in the second movement direction 46.

Moreover, the spring support frame 36 can be supported on the side part 26 via the two axial protrusions 52, 54 inside the corresponding guides 56, 58 also outwardly in the radial direction 8 and inwardly in the radial direction 10. Thus, it is possible, for example, to arrange the outer limb 42 of the spring support frame 36 to be spaced apart from the inner side 22 of the first race 16 in the radial direction 8, 10, as is indicated in FIG. 1 by means of the clearance 62. Alternatively or additionally, the outer limb 42 can be able to be supported or can be supported on the inner side 22 in the radial direction 8, i.e. substantially transversely to the first and second movement direction 40, 46, by avoiding the clearance 62, although said clearance 62 ensures a relatively lightweight first race 16 or spring support frame 36 that is small to construct being able to be used.

Figure 2A:
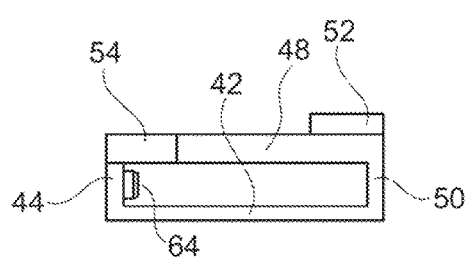
FIGS. 2A to 2D show various view of the spring support frame of FIG. 1 on its own from various viewing directions, FIG. 3 a partial perspective depiction of a second embodiment of the freewheel, FIG. 4 the freewheel of FIG. 3 in a side view.
Figure 2B:
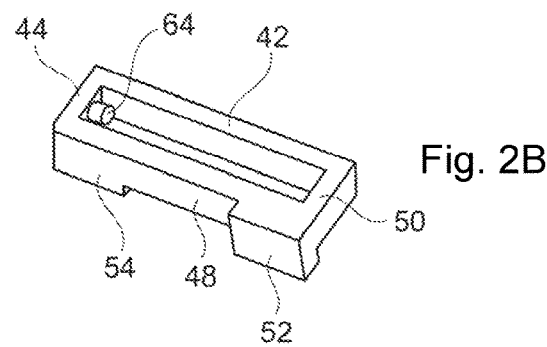
Figure 2C:
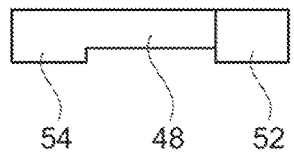
Figure 2D:
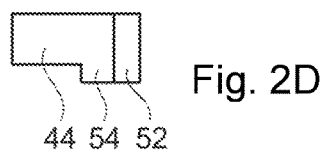

In order to ensure a secure arrangement of the spring element 34 inside the spring support frame 36, the spring support frame 36 further has at least one spring holding means 64 for supporting the spring element 34 arranged in the spring support frame 36 in both opposite axial directions 4, 6, which can be seen, in particular, in FIGS. 2a and 2b. Here, the spring holding means 64 is formed integrally with the spring support frame 36, although the spring support means could, in principle, also be formed separately from the spring support frame 36 and fixed on the spring support frame 36, optionally releasably. In the concrete embodiment according to FIGS. 1 and 2, the spring holding means 64 is formed by a spring holding attachment 66 protruding into the spring support frame 36, said spring holding attachment extending into a coil spring interior chamber of the spring element 34 formed as a coil spring and thus into one or more coils, such that the spring element 34 can be supported or is supported on the spring support frame 36 at least partially in the opposite axial directions 4, 6 via the spring holding attachment 66. The spring holding attachment 66 is—as can be seen in FIGS. 2a and 2b—arranged on the side of the contact limb 44 facing towards the spring element 34, in order to extend in the first movement direction 40 into the coil spring interior chamber of the spring element 34 formed as a coiled spring, wherein the spring holding attachment 66 is in turn preferably formed integrally with a contact limb 44, although a separate spring holding attachment 66 that is releasably fixed on the contact limb 44 could also be provided here in principle.

The spring support frame 36 is formed integrally together with the spring holding attachment 66, the axial protrusions 52, 54, its outer limb 42, its inner limb 48, its contact limb 44 and its support limb 50, wherein the spring support frame 36 is produced from plastic or metal. From the point of view of production, a production from plastic has proved to be advantageous for the spring support frame 36 according to FIGS. 1 and 2. A spring support frame 36 similar to the spring support frame 36 according to FIG. 2 is moreover shown in FIG. 6, wherein here, for reasons of clarity, the depiction of the axial protrusions 52, 54 has been dispensed with, which—if a different guide of the spring support frame 36 is intended—can also be left out. In each case, the spring support frame 36 according to FIG. 6 also shows a spring holding means 64 in the form of a spring holding attachment 66, which is nevertheless formed to be longer than the spring holding attachment 66 in FIG. 2. In general, the embodiments in relation to the spring support frame 36 according to FIG. 2 apply correspondingly to the spring support frame 36 according to FIG. 6.

Figure 3:
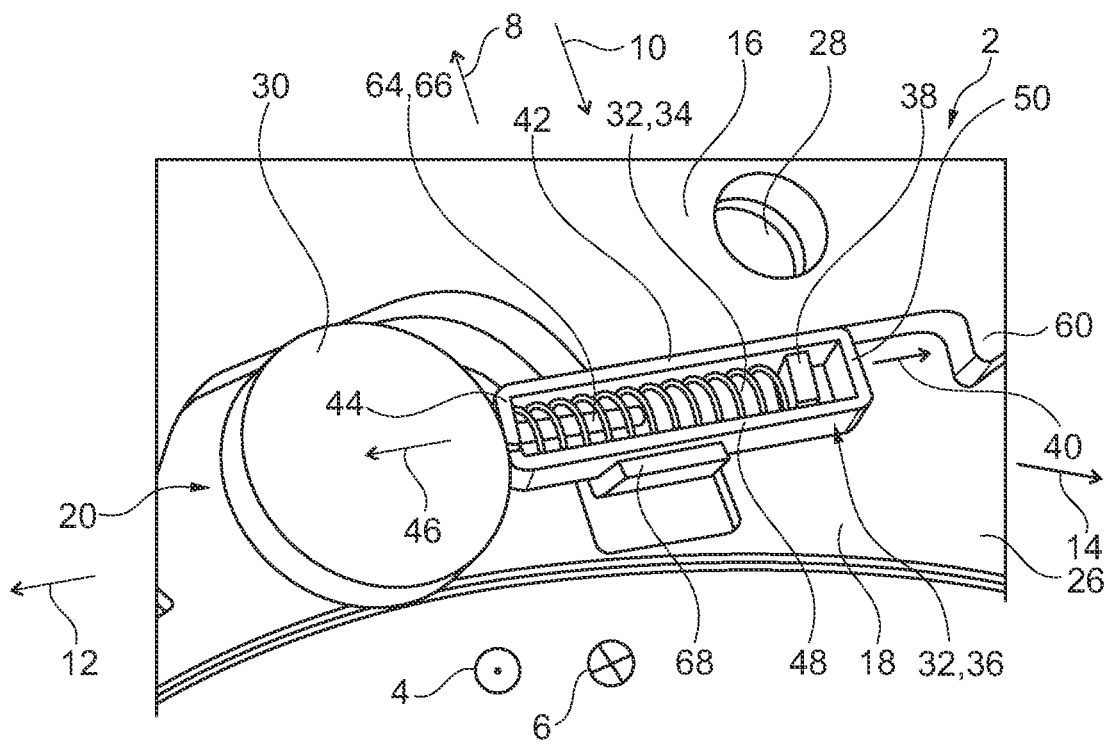
Figure 4:
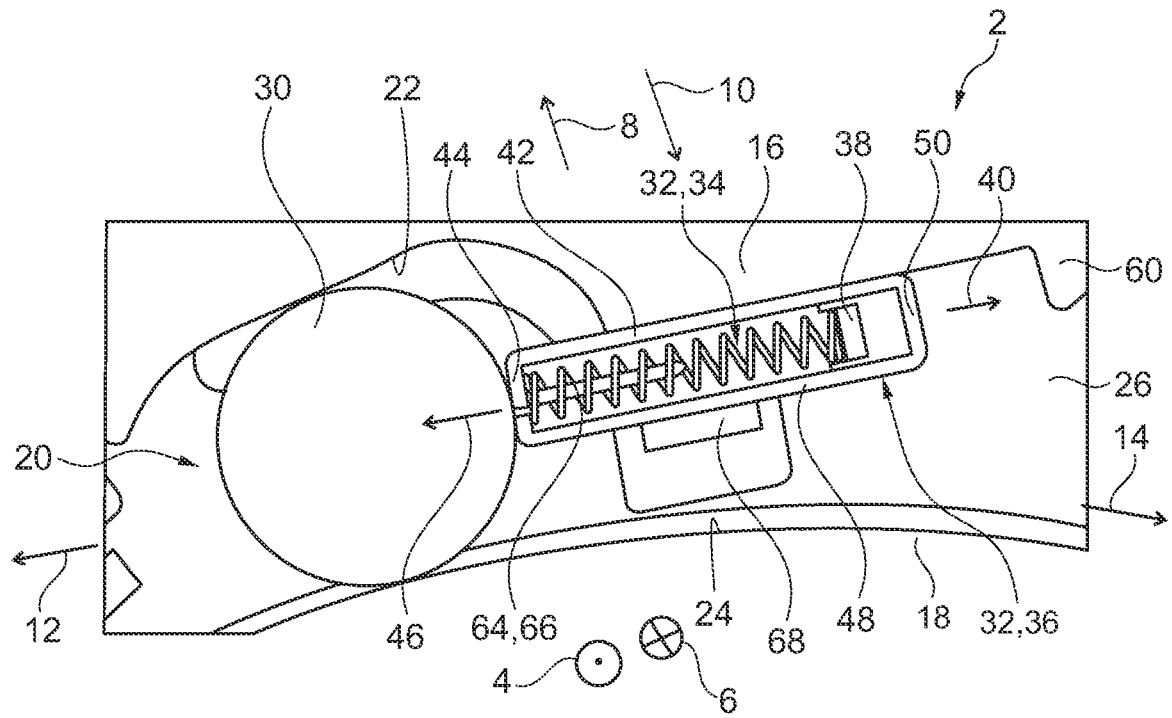

FIGS. 3 and 4 show a second embodiment of the freewheel 2 which corresponds substantially to the first embodiment according to FIGS. 1 and 2, wherein only the differences are to be elaborated on below, the same reference numerals are used for the same or similar parts and the description above applies correspondingly in general.

From the comparison between FIGS. 3 and 4 and the first embodiment according to FIGS. 1 and 2, it is firstly obvious that, in the second embodiment, the first and second guide 56, 58 in the form of the recesses inside the side part 26, consequently also the first and second axial protrusion 52, 54 on the spring support frame 36 of the pre-tensioning device 32, are dispensed with. Regardless of this, the spring support frame 36 in the second embodiment can also be shifted in relation to the first race 16 in a secure translational manner in the opposite movement directions 40, 46 and can be supported or is supported on the first race 16 in the radial direction 8, 10 both directly and indirectly. For this purpose, a second protruding attachment 68 is provided on the side part 26, said attachment serving to support the inner limb 48 inwardly in the radial direction 10. The second protruding attachment 68 engages behind the inner limb 48, here from the inside in the radial direction 10, wherein the second protruding attachment 68 protrudes into the clamping gap 20 in the axial direction 4 starting from the side part 26. Similarly to the first protruding attachment 38, the second protruding attachment 68 is also formed integrally with the side part 26, wherein the second protruding attachment 68 is formed as a bent support tongue, which is bent out of the side part 26, in order to be arranged below the inner limb 48 in the radial direction 10. The second protruding attachment 68 is also formed in an elongated manner in the opposite movement directions 40, 46 of the pre-tensioning device 32, such that a support that covers a large surface area and is secure from tilting is given inwardly in the radial direction 10 and a corresponding guide is given in said movement directions 40, 46. In contrast, by avoiding the clearance 62 indicated in FIG. 1, in the second embodiment, the outer limb 42 of the spring support frame 36 is supported on the inner side 22 of the first race 16 outwardly in the radial direction 8 and is guided in the first and second movement direction 40, 46 of the pre-tensioning device 32, wherein the inner side 22 of the first race 16 is formed as a straight line for this purpose, in order to ensure a secure support and guide.

The spring support frame 36 of the pre-tensioning device 32, as shown in FIGS. 3 and 4, is shown again on its own in FIG. 5a, while FIGS. 5b 5 to 5d show further alternative design variants. The design variants shown in FIG. 5 have in common that the spring support frame 36 is produced from metal. Expressed more precisely, the spring support frames 36 are bent out of an elongated, preferably strip-like, metal part, wherein the elongated metal parts have two ends 70, 72. In the embodiment variant according to FIG. 5a, only one end portion 74, placed in front of the end 70, of the metal part forms the spring holding means 64 in the form of the spring holding attachment 66. In the embodiment variant according to FIG. 5b, said end portion 74 forms the spring holding means 64, together with an end portion 76 placed in front of the end 72, in the form of the spring holding attachment 66. In the embodiment variant according to FIG. 5c, a folded central portion 78 of the metal part forms the spring holding means 64 in the form of the spring holding attachment 66, while the two ends 70, 72 of the metal part are guided together somewhere else on the frame, here in the region of the transition between the outer limb 42 and the support limb 50. The embodiment variant according to FIG. 5d substantially corresponds to the embodiment variant according to FIG. 5c, wherein the ends 70, 72 are not only guided together in the region of the support limb 50, but rather also are welded to each other. Correspondingly, the free ends 70, 72 of the metal part could also be welded to each other from the embodiment variants according to FIGS. 5b and 5c, in order to create a particularly rigid spring support frame 36. In the case of the embodiment variant according to FIG. 5b, the end portions 74, 76 shown there could also be welded to each other. In the case of the embodiment variant according to FIG. 5a, at least the end 72 in the region of the contact limb 44 could be welded to a portion of the metal part also forming the contact limb 44.

The embodiment variant of the spring support frame 36 according to FIG. 6 has already been described in more detail above. Because of the lack of axial protrusions 52, 54, the spring support frame 36 shown in FIG. 6 can be applied or used similarly to the embodiment variants described above according to FIGS. 5a to 5d as well as in the embodiment according to FIGS. 3 and 4. Furthermore, it should be noted that the spring holding attachment 66 is formed substantially conically and tapers away from the contact limb 44.

Figure 7:
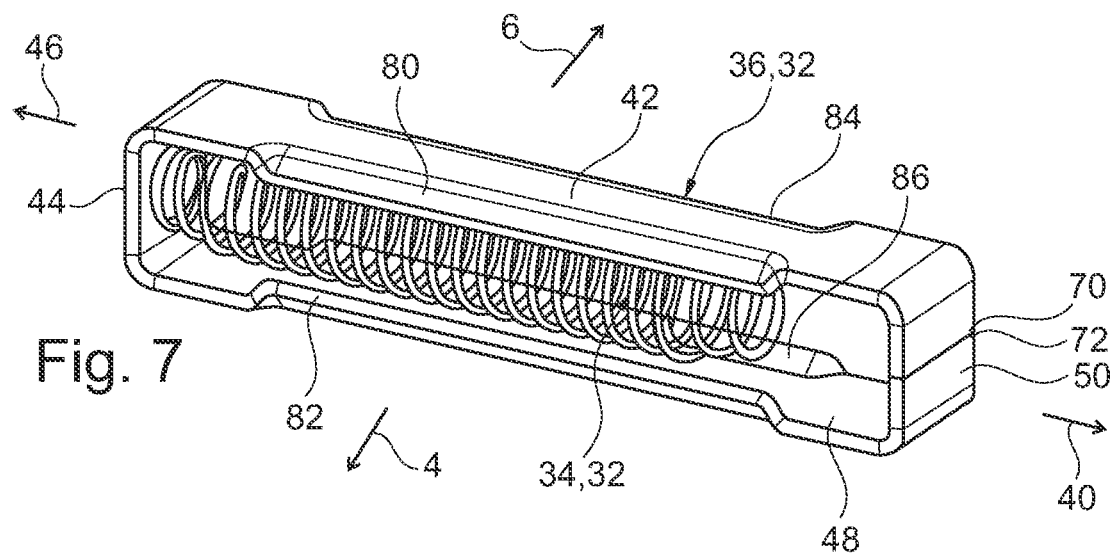
Figure 8:
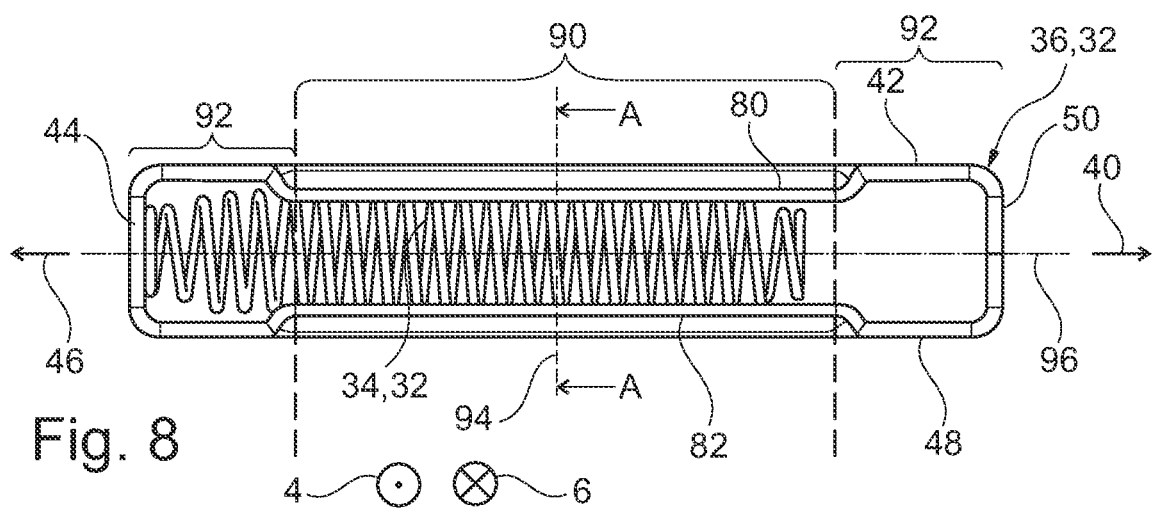
Figure 9:
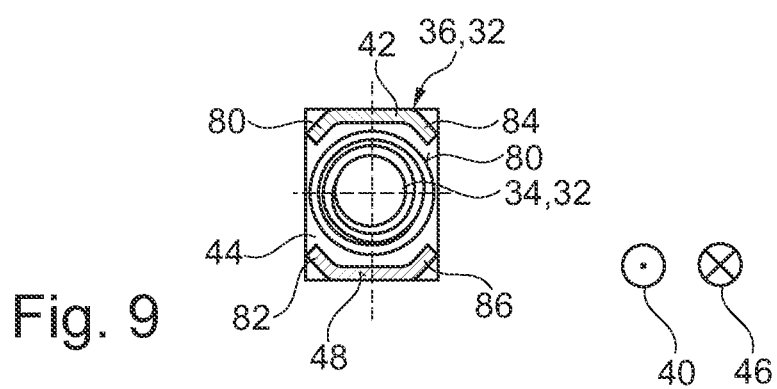

A particularly preferred embodiment variant of the pre-tensioning device 32 for the use in the freewheel 2 according to FIGS. 3 and 4 is shown on its own in FIGS. 7 to 9, wherein the above statements for the pre-tensioning device 32 apply correspondingly with the corresponding reference, and the differences to the embodiment variants shown above are elaborated on in the first place.

Also in the embodiment variant according to FIGS. 7 to 9, the spring support frame 36 is bent out of an elongated, strip-like metal part, wherein the ends 70, 72 are welded to each other, here by way of example in the region of the support limb 50. A spring holding means 64 in the form of the spring holding attachment 66, however, is dispensed with; instead, four spring holding means 80, 82, 84, 86 are provided to support the spring element 34 arranged in the spring support frame 36 in both axial directions 4, 6. Here, the spring holding means 80, 82, 84, 86 engage around the spring element 34 in the axial direction 4 or 6 from the outside, in order to ensure the support in said axial directions 4, 6. Thus, the spring holding means 80, 84 are provided on the outer limb 42 and are formed integrally with it, while the spring holding means 82, 86 are provided on the inner limb 48 and formed integrally with it. The outer limb 42 is formed curved or bent by forming the two spring holding means 80, 84 in a manner at least partially engaging around a spring outer periphery 88 of the spring element 34 formed as a coil spring or coil compression spring, as can be seen in particular in FIG. 9. Correspondingly, the inner limb 48 is also formed curved or bent by forming the spring holding means 82, 86 in a manner engaging around the spring outer periphery 88 at least partially, as can also be seen in FIG. 9. The curved or bent region of the outer and inner limb 42, 48, however, is only formed in a central portion 90 of the two limbs 42, 48, such that the inserted spring element 34 can be introduced in one of the axial directions 4 or 6 in the region of the two remaining side portions 92. It can also be seen from FIG. 8 that the spring support frame 36 is formed mirror-symmetrically in the movement directions 40, 46 in relation to a plane 94 of symmetry. This applies correspondingly to the spring element 34, which is shifted only in the second movement direction 46 inside the spring support frame 36 in FIG. 8, yet which would also be formed symmetrically in a central position in relation to the plane 94 of symmetry. It can also be seen in FIG. 8 that the coil diameter of the spring element 34 formed as a coil spring reduces both in the first movement direction 40 and in the second movement direction 46 towards the respective end, which simplifies the introduction of the spring element 34 into the spring support frame 36. Moreover, the spring support frame 36 is also formed symmetrically with a view to a further plane 96 of symmetry.

Because of said symmetry, it is possible to introduce the pre-tensioning device 32 into the freewheel 2 in various orientations, which simplifies the mounting of the freewheel 2 significantly. Thus, the pre-tensioning device 32 can be orientated, for example, in such a way that the contact limb 44 assumes the function of the support limb 50 described above, while the support limb 50 according to FIGS. 7 to 9 fulfils the function of the contact limb 44 described, namely producing contact with the clamping element 30. Furthermore, the pre-tensioning device 32 can be inserted into the freewheel 2 according to FIGS. 3 to 4 in such a way that the outer limb 42 according to FIGS. 7 to 9 points inwardly in the radial direction 10, while the inner limb 48 according to FIGS. 7 to 9 points outwardly in the radial direction 8.

LIST OF REFERENCE NUMERALS

2 Freewheel
4 Axial direction
6 Axial direction
8 Radial direction
10 Radial direction
12 Peripheral direction
14 Peripheral direction
16 First race
18 Second race
20 Clamping gap
22 Inner side
24 Outer side
26 Side part
28 Fixing hole
30 Clamping element
32 Pre-tensioning device
34 Spring element
36 Spring support frame
38 First protruding attachment
40 First movement direction
42 Outer limb
44 Contact limb
46 Second movement direction
48 Inner limb
50 Support limb
52 First axial protrusion
54 Second axial protrusion
56 First guide
58 Second guide
60 Abutment
62 Clearance
64 Spring holding means
66 Spring holding attachment
68 Second protruding attachment
70 End
72 End
74 End portion
76 End portion
78 Central portion
80 Spring holding means 82 Spring holding means
84 Spring holding means
86 Spring holding means
88 Spring outer periphery
90 Central portion
92 Side portions
94 Plane of symmetry
96 Plane of symmetry

The invention claimed is:

1. A freewheel (2) comprising a first race (16), a second race (18), a clamping gap (20) formed between the first and second race (16, 18), at least one clamping element (30) in the clamping gap (20) and a pre-tensioning device (32) for pre-tensioning the clamping element (30) in a clamping position inside the clamping gap (20), wherein the pre-tensioning device (32) has a spring element (34) supported indirectly or directly on the first race (16), wherein the pre-tensioning device (32) further has a spring support frame (36) that can be moved in relation to the first race (16), in which spring support frame the spring element (34) is arranged,
wherein at least one side part (26) is connected to the first race (16) in a rotationally entrained manner and is provided for delimiting the clamping gap (20) in an axial direction (4; 6), wherein, on the side part (26), a first protruding attachment (38) is provided on the first race (16) for indirect support of the spring element (34) via the first protruding attachment (38) of the side part (26),
wherein the spring support frame (36) has an outer limb (42) for supporting the spring element (34) outwardly in the radial direction (8) and an inner limb (48) opposite the outer limb (42) for supporting the spring element (34) inwardly in the radial direction (10), and
wherein, on the side part (26), a second protruding attachment (68) is provided inwardly in the radial direction (10) for supporting the inner limb (48).

2. The freewheel (2) according to claim 1, wherein the spring support frame (36) has a contact limb (44), via which the spring element (34) can be supported or is supported on the clamping element (30).

3. The freewheel (2) according to claim 1, wherein the at least one side part (26) is further defined as two opposite side parts (26), which are connected to the first race (16) in the rotationally entrained manner and are provided for delimiting the clamping gap (20) in the axial direction (4; 6).

4. The freewheel (2) according to claim 1, wherein the first protruding attachment (38) extends into the spring support frame (36), wherein the spring support frame (36) has a support limb (50) opposite a contact limb (44), via which the spring element (34) can be supported or is supported on the clamping element (30).

5. The freewheel (2) according to claim 4, wherein the support limb (50) is able to be supported on the first protruding attachment (38) and/or the first race (16).

6. The freewheel (2) according to claim 1, wherein the second protruding attachment (68) is formed integrally with the side part (26), optionally as a bent support tongue.

7. The freewheel (2) according to claim 1, wherein at least one axial protrusion (52; 54) is provided on the spring support frame (36), said axial protrusion extending into a guide (56; 58) in the side part (26).

8. The freewheel (2) according to claim 7, wherein at least two axial protrusions (52, 54) are provided, and the axial protrusion (52; 54) can be supported or are supported on the side part (26) upon reaching at least one end position inside the guide (56; 58).

9. The freewheel (2) according to claim 1, wherein the spring support frame (36) has at least one spring holding means (64; 80; 82; 84; 86) for supporting the spring element (34) arranged in the spring support frame (36) in the axial direction (4; 6) or in both axial directions (4, 6).

10. The freewheel (2) according to claim 9, wherein the spring holding means (64) is a spring holding attachment (66) protruding into the spring support frame (36), said spring holding attachment extending into a coil spring interior chamber of the spring element (34) formed as a coil spring.

11. The freewheel (2) according to claim 10, wherein the protruding spring holding attachment (66) is arranged on a contact limb (44), wherein the spring support frame (36) has the contact limb (44), via which the spring element (34) can be supported or is supported on the clamping element (30).

12. The freewheel (2) according to claim 11, wherein the protruding spring holding attachment (66) is formed integrally with the contact limb (44).

13. The freewheel (2) according to claim 9, wherein the spring holding means (80, 82, 84, 86) engages a side of the spring element (34) at least partially from an outside in the axial direction (4; 6).

14. The freewheel (2) according to claim 13, wherein the spring holding means (80, 82, 84, 86) is arranged on the outer and/or inner limb (42; 48) and is optionally formed integrally with the outer and/or inner limb (42; 48), wherein the outer and/or inner limb (42; 48) is formed curved or bent.

15. The freewheel (2) according to claim 14, wherein the outer and/or inner limb (42; 48) is formed by forming the spring holding means (80, 82, 84, 86) in a manner at least partially engaging around a spring outer periphery (88) of the spring element (34) formed as a coil spring.

16. The freewheel (2) according to claim 9, wherein the at least one spring holding means (64; 80; 82; 84; 86) is formed integrally with the spring support frame (36).

17. The freewheel (2) according to claim 1, wherein the spring support frame (36) is formed integrally and/or produced from plastic or metal, wherein the spring support frame (36) produced from metal is bent out of an elongated metal part.

18. The freewheel (2) according to claim 17, wherein the spring support frame (36) produced from metal is welded on an end side (70; 72).

19. The freewheel (2) according to claim 1, wherein the first protruding attachment (38) is formed integrally with the side part (26), optionally as a bent support tongue.

20. A freewheel (2) comprising a first race (16), a second race (18), a clamping gap (20) formed between the first and second race (16, 18), at least one clamping element (30) in the clamping gap (20) and a pre-tensioning device (32) for pre-tensioning the clamping element (30) in a clamping position inside the clamping gap (20), wherein the pre-tensioning device (32) has a spring element (34) supported indirectly or directly on the first race (16), wherein the pre-tensioning device (32) further has a spring support frame (36) that can be moved in relation to the first race (16), in which spring support frame the spring element (34) is arranged,
wherein the spring support frame (36) has at least one spring holding means (64; 80; 82; 84; 86) for supporting the spring element (34) arranged in the spring support frame (36) in at least one axial direction (4; 6) or in both axial directions (4, 6),
wherein the spring holding means (80, 82, 84, 86) engages a side of the spring element (34) at least partially from an outside in the axial direction (4; 6), wherein the spring holding means (80, 82, 84, 86) is arranged on an outer and/or inner limb (42; 48) and is optionally formed integrally with the outer and/or inner limb (42; 48), wherein the outer and/or inner limb (42; 48) is formed curved or bent, and wherein the outer and/or inner limb (42; 48) is formed by forming the spring holding means (80, 82, 84, 86) in a manner at least partially engaging around a spring outer periphery (88) of the spring element (34) formed as a coil spring.

\* \* \* \* \*